July 31, 1934.  V. G. APPLE  1,968,585
BRAKE MECHANISM
Original Filed Nov. 2, 1929  2 Sheets-Sheet 1

INVENTOR.
Vincent G. Apple
BY
Burton & McConkey
ATTORNEYS

Patented July 31, 1934

1,968,585

UNITED STATES PATENT OFFICE 1,968,585

BRAKE MECHANISM

Vincent G. Apple, Dayton, Ohio, assignor to Bendix Brake Company, South Bend, Ind., a corporation of Illinois Application November 2, 1929, Serial No. 404,234
Renewed August 7, 1930

9 Claims. (Cl. 188—156)

My invention relates to brake mechanism and particularly to automotive brake mechanism wherein friction brake mechanism and electric power mechanism are arranged within a completely enclosed drum, and wherein manual operating means is employed to independently actuate the brake friction means while permitting independent actuation thereof by the electric power means, and wherein this arrangement of mechanism is adapted to a full floating axle.

An object is to provide such a construction for a full floating axle and particularly to provide means in the form of a sleeve rotatable about the axle and extending through one side of the drum and provided with a bearing for such side of the drum, which sleeve is manually operable from a point outside of the drum, and is connected with the friction means to actuate the same.

Figure 1:
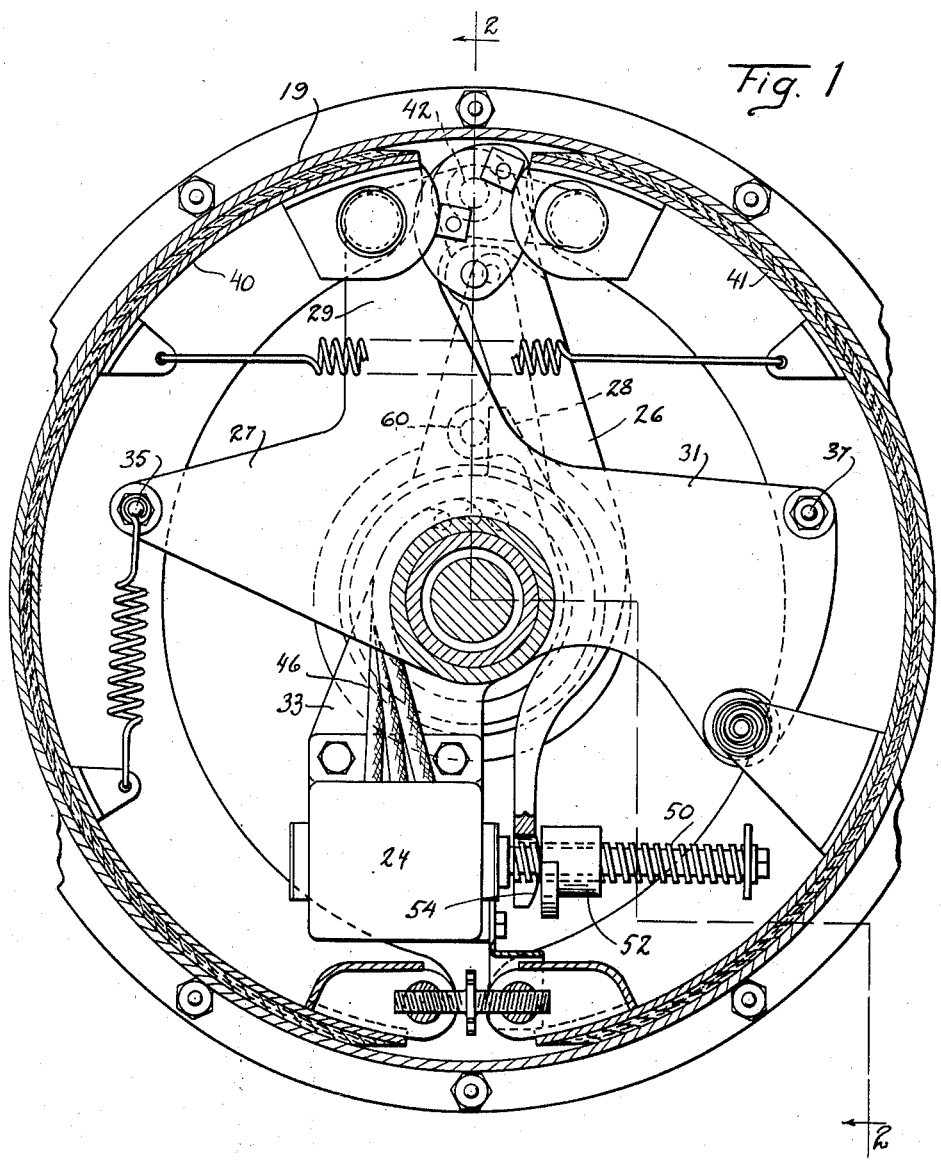
Figure 2:
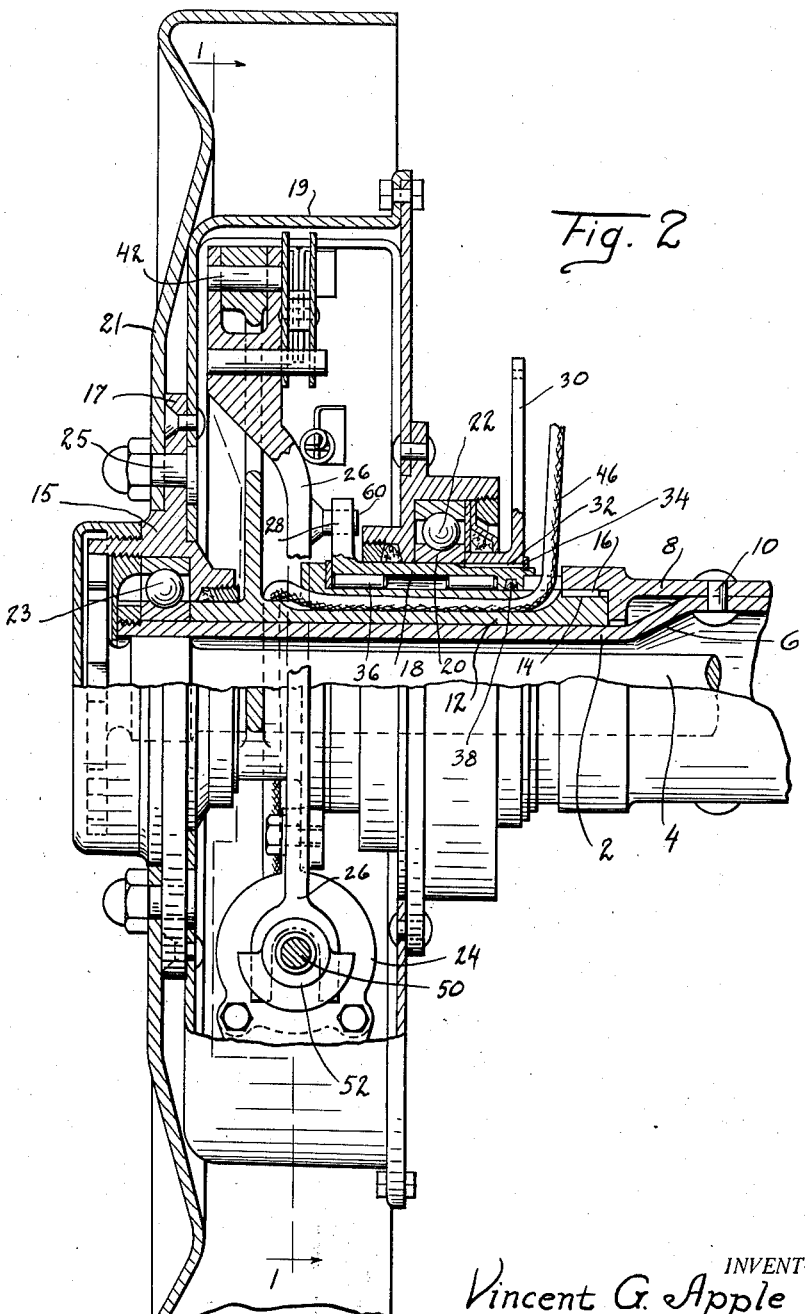

Other objects and meritorious features of my invention will become apparent from the following description taken in conjunction with the accompanying drawings, wherein Fig. 1 is a transverse section taken on the line 1—1 of Fig. 2, and Fig. 2 is a vertical axial section taken on the line 2—2 of Fig. 1. The construction herein described is similar to that shown in my Patent No. 1,876,541 wherein the construction is broadly disclosed and claimed.

The tubular spindle 2 in which the rear axle 4 is housed is swaged as at 6 and the reinforcing member 8 is riveted thereto, as at 10. An axle member 12 fits snugly about the spindle 2 and is secured against rotation thereon by a series of external teeth 14 located at the end of the hub which mesh with the internal teeth 16 on the reinforcing member 8.

The sleeve 18 is rotatably mounted on the axle member 12 and carries the inner race 20 of the bearing member 22. A second bearing member 23 is located at the outer extremity of the tubular spindle 2 and on these two bearing members the rotatable wheel and drum structure is journalled. This structure consists of a hub member 15 which is keyed to the axle 4 and provided with a radially extending flange 17, to the inner side of which is riveted the brake drum 19. The wheel member 21 is bolted to the flange and the drum by means of the bolt 25.

Axle member 12 is provided with a plurality of arms 27, 29, 31, and 33, extending radially therefrom. The channel shaped brake shoes 40 and 41 are secured to the arms 27 and 31 by means of the studs 35 and 37 affixed to the said arms.

The cam actuating, or brake operating, arm 26 is pivoted to the radially extending arm 29 at 42 and to the downwardly depending flange is secured the electric motor 24. A plurality of conduits 46 extending longitudinally through the hub member 12 and opening into the interior of the brake drum casing serve as a guide for electric cable conductors through which current is passed from some convenient source outside the casing to the electric motor.

The armature shaft of the motor is provided with a threaded extension 50 on which the internally threaded weighted runner 52 is axially slidable. The lower extremity of the brake arm 26 is bifurcated to straddle the extension 50 and its face rounded somewhat, as at 54, in order that it may be more readily actuated by the runner 52 as the latter is forced to slide along the armature extension as it rotates. The brakes as illustrated are in their "on" position, but when the current through the motor is reversed, and consequently the direction of rotation of the armature extension shaft, the runner 52 slides toward the outer extremity of the shaft and permits the lever arm 26 to follow it through the action of the conventional spring retractors.

I have incorporated certain structure in this assembly for the purpose of permitting manual operation of the brake shoes 40 and 41 either independently of, or in conjunction with, the power application thereof by the electric motor 24. On the brake actuating arm is a stud 60 which disconnectedly contacts with the arm 28 carried by the rotatable sleeve 18. A second arm 30 is secured to the sleeve 18 by a system of multiple keys 32 and is held against axial movement by means of the split snap ring 34. Manual linkage is, of course, to be connected to the arm 30 for the purpose of rotating the sleeve 18 to swing the stud 28 to actuate the arm 26, thereby actuating the brake shoes, while at the same time permitting independent application of the brakes through the operation of the electric motor 24. The present invention contemplates the use of a single set of brakes for all purposes rather than providing an independent brake for emergency operation.

Rollers 36 reduce the resistance to rotation of the sleeve 18 when actuated by the arm 30 and an oil seal ring 38 prevents escape of the lubricant.

A preferable use of my invention is to employ it in a hook-up where there is manual linkage from the customary brake pedal to the brake and a rheostat so connected in this manual linkage that increased manual effort applied to the brake pedal will lower the resistance through the rheostat and thereby provide increased current for operating the electric motor brake applying device. Thus the resulting total brake applying force will vary directly as the manual effort exerted on the foot pedal and be a multiple thereof.

I claim:

1. Vehicle brake mechanism comprising a non-rotatable axle, an axle member secured against rotation thereon, a sleeve rotatable about said axle member having a radially extending arm at each end, brake friction means supported by the axle member, electric motor means supported by the axle member for actuating the friction means, a closed rotatable brake drum having a bearing on said axle at one end and on the sleeve intermediate the arms at the other end, and means whereby rotation of the sleeve urges the friction means against the drum independently of the electric motor.

2. Vehicle brake mechanism comprising a non-rotatable axle, an axle member secured against rotation thereon, brake friction means and a brake applying arm supported by said axle member, an electric motor supported by said axle member operable to actuate the arm, a sleeve rotatably mounted on said axle member, a rotatable brake drum having its outer bearing on said axle and its inner bearing on said sleeve, an arm at each end of said sleeve, said arms arranged on opposite sides of the inner face of the drum, said inner arm disconnectedly coupled with the brake applying arm for independent manual operation of the brakes.

3. Vehicle brake mechanism comprising a non-rotatable axle, an axle member secured against rotation thereon having radially extending arms, brake friction means supported by said axle member, a cam lever pivoted to one of the arms thereof, an electric motor supported by the axle member for actuating the lever, a sleeve rotatable about the axle member for actuating the cam lever independently of the electric motor, a rotatable drum enclosing said friction means and having a bearing upon the sleeve.

4. Vehicle brake mechanism comprising a non-rotatable tubular axle swaged adjacent to one end, a reinforcing member secured thereto and having a portion protruding beyond the swaged portion thereof, an axle member having radially extending arms mounted on said tubular axle and keyed to said protrusion, a closed brake drum rotatably mounted on said tubular axle, brake friction means and an electric motor for expanding the same supported by said axle member within the drum, a sleeve rotatable upon said axle member extending through one side of the drum, a bearing encircling said sleeve for such side of the drum, means engaging the end of the sleeve outside of the drum to rotate the sleeve, and means coupling the end of the sleeve within the drum with the friction means.

5. Brake mechanism comprising a non-rotatable axle, an axle member secured against rotation thereon, a sleeve rotatable about said axle member having a radially extending arm on each end, radially expansible friction means supported by said axle member, a cam arm for expanding said means, electro-magnetic means supported by the axle member for actuating the cam arm, a closed rotatable brake drum having bearing surfaces on said axle member and sleeve intermediate the arms on the sleeve, and means whereby rotation of the sleeve expands the shoes independently of the electromagnet.

6. Brake mechanism comprising a non-rotatable axle, an axle member secured against rotation thereon, radially expansible brake friction means and a brake applying arm supported by said axle member, an electric power device supported by the axle member operable to actuate the arm, a sleeve rotatably mounted on said axle member, a rotatable brake drum having its outer bearing on said axle member and its inner bearing on said sleeve, a radially extending arm at each end of said sleeve, said arms arranged on opposite sides of the inner face of the drum, said inner arm coupled with the brake applying arm for independent manual operation of the brakes.

7. Brake mechanism comprising a non-rotatable tubular axle spindle swaged at one end, a reinforcing member secured to said spindle and having a portion protruding beyond the swaged portion thereof, an axle member having radially extending arms mounted on said spindle and secured to said protrusion, a closed brake drum rotatably mounted on said spindle, radially expansible friction shoes and power means for actuating them supported by said axle member within the brake drum, and means extending from within to a point outside whereby said friction shoes may be manually expanded independently of the power means from the exterior of the drum.

8. In combination with an axle housing, an axle member fixedly positioned thereabout, a sleeve rotatably journaled about said axle member, a brake drum and wheel assembly rotatably journaled about said axle member, one end bearing thereof being positioned about said rotatable sleeve, retarding mechanism positioned by said axle member within the drum, and means associated with said rotatable sleeve for actuating said retarding means from a point outside the drum.

9. Braking mechanism comprising a non-rotatable axle, a drum closed at the ends supported for rotation about said axle, a non-rotatable axle member on said axle having portions extending radially outward into the enclosure within said drum, brake shoes and power applying means for operating said shoes supported within said enclosure and held against rotation in and by said radially extending axle member portions, a sleeve having a radially extending arm at each end rotatably mounted on said axle, one arm being located inside the drum and the other outside the drum, and means whereby rotation of said sleeve operates said shoes independently of the power applying means.

VINCENT G. APPLE.